United States Patent [19]
Harris et al.

[11] Patent Number: 5,886,091
[45] Date of Patent: Mar. 23, 1999

[54] PRINTING INK COMPOSITION

[75] Inventors: Philip G. Harris, Spartanburg; Patrick D. Moore, Pacolet, both of S.C.

[73] Assignee: Milliken & Company, Spartanburg, S.C.

[21] Appl. No.: 583,870

[22] Filed: Jan. 5, 1996

[51] Int. Cl.$^6$ ............................. C08J 3/00; C08K 3/20; C08L 75/00
[52] U.S. Cl. ............... 524/590; 106/19 R; 106/20 R; 106/22 R; 523/160; 523/161; 524/589
[58] Field of Search ................. 523/160, 161; 524/590, 589; 106/19 R, 20 R, 22 R

[56] References Cited

U.S. PATENT DOCUMENTS

| | | | |
|---|---|---|---|
| 3,213,058 | 10/1965 | Boyle et al. | 260/47 |
| 3,278,486 | 10/1966 | Meek et al. | 260/47 |
| 3,928,292 | 12/1975 | Maeda et al. | 260/77.5 AQ |
| 4,284,729 | 8/1981 | Cross et al. | 521/158 |
| 4,619,990 | 10/1986 | Elmasry et al. | 534/573 |
| 4,666,819 | 5/1987 | Elmasry et al. | 430/270 |
| 4,820,601 | 4/1989 | Ong et al. | 430/58 |
| 4,831,109 | 5/1989 | Mitra et al. | 528/125 |
| 4,985,528 | 1/1991 | Mignani et al. | 528/59 |
| 5,176,745 | 1/1993 | Moore et al. | 106/22 |
| 5,194,463 | 3/1993 | Krutak et al. | 524/35 |
| 5,389,130 | 2/1995 | Batlaw et al. | 106/20 |

FOREIGN PATENT DOCUMENTS

| | | |
|---|---|---|
| 0 193 052 A1 | 9/1986 | European Pat. Off. ...... C07C 107/04 |
| 0398472A2 | 11/1990 | European Pat. Off. . |
| 2317316 | 2/1977 | France . |
| 2426172 | 5/1974 | Germany . |
| 63-307883 | 10/1990 | Japan . |
| WO 96/18697 | 6/1996 | WIPO ............... C09D 11/16 |

OTHER PUBLICATIONS

Odian, G., Principles of Polymerization, 1981, pp. 20–25.

*Primary Examiner*—Patrick D. Niland
*Attorney, Agent, or Firm*—Terry T. Moyer; Timothy J. Monahan

[57] ABSTRACT

An ink composition for publication gravure printing is provided with a colored polyurethane oligomer dissolved in the solvent component of the ink.

20 Claims, No Drawings

PRINTING INK COMPOSITION

BACKGROUND OF THE INVENTION

This invention relates generally to an ink composition, and in particular to a publication gravure ink containing a polyurethane bound colorant.

Publication gravure or rotogravure printing is a process in which an engraved metal cylinder is used to transfer ink to paper. The depth of the engraving determines the amount of ink which is picked up by the rotating cylinder, and in turn, determines the depth of shade on the printed sheet. Engraving the metal cylinder is typically accomplished by etching with acid or by mechanical engraving, to produce slight indentations in the surface of the cylinder called cells. The number of cells may range from 22,000 cells per inch for standard quality printing, to 32,000 cells per inch or more for high quality reproductions. Each individual cell is from 20 to 200 microns in width.

The inks used in publication gravure consists of a colorant and a liquid vehicle, in which the colorant, typically a pigment, is dispersed. After the ink is applied, a binder present in the vehicle affixes the colorant to the substrate on which it is printed. The binder may be a drying oil, which oxidizes and is converted from a liquid to a solid film, or a resin dissolved or dispersed in a solvent, which forms a solid film binding the colorant to a substrate after the solvent is evaporated. Combinations of drying oils, resins and organic solvents are also employed.

Gravure inks consist of approximately 30 wt. % of non-volatile components, made up primarily of the binder and colorant. The binder and colorant are typically present in a ratio ranging from about 5:1 to about 1:1 by weight, respectively.

The resolution of gravure printing may be improved by increasing the number of cells per inch. However, as the density of the cells increase, it becomes necessary to make them smaller, which in turn limits the volume of ink which can be picked up and transferred to the paper. Consequently, it becomes increasingly difficult to print darker shades at higher resolutions using the gravure process. Adjusting the color strength, by increasing the solids content of the ink, can raise the viscosity of the ink above acceptable levels.

Publication gravure printing, as well as lithographic printing and flexographic printing, require inks with unique performance characteristics. Pigments, and to a much lesser extent dyes, are employed as colorants in the inks. Typically, the pigments are milled to a mean particle size of less than 2 microns and dispersed in the vehicle, often with the aid of specialized dispersants. It has been proposed that colored polymeric resins, such as polyurethane bound colorants, may be substituted for conventional pigments. Meek, U.S. Pat. No. 3,278,486, suggest that colored polymers can be employed in inks, paints and similar materials. Krutak et al, U.S. Pat. No. 5,194,463 disclose polyurethane polymers having difunctional chromophores copolymerized therewith. The colored polymers can be ground to very fine powders and dispersed in inks or coating compositions. Moore et al., U.S. Pat. No. 5,176,745 disclose poly(oxyalkylene) substituted colorants reacted with alkenyl succinic anhydrides to provide a water soluble colorant for inks. Despite the availability of such prior art colored polymers, they have not been commercially significant in the field of printing inks, especially not in publication gravure printing.

Polyurethane-bound poly(oxyalkylene) substituted colorants are disclosed in Cross et al., U.S. Pat. No. 4,284,729. The colorants are particularly useful for in situ coloration of polyurethane foam.

SUMMARY OF THE INVENTION

Therefore, an object of the invention is to provide a gravure ink with increased color strength. Another object of the invention is to provide a gravure ink with reduced non-volatile components (solids) content, without sacrificing color strength. Still another object of the invention is to replace all or part of the binder in a conventional gravure ink composition with a colored polyurethane oligomer. Yet another object of the invention is to provide a gravure printing process employing the novel gravure ink disclosed herein.

Accordingly, an ink composition is provided having a volatile solvent and a non-volatile, film forming component, with the improvement of a colored polyurethane oligomer included in the non-volatile component, wherein the colored polyurethane oligomer is dissolved in the volatile solvent.

The present gravure ink composition has the advantage of being compatible with higher resolution engraved cylinders, which employ relatively shallow cells, and can achieve full color strength on printed substrates. Further, the present ink composition allows for improved color utilization and low solids compositions, which reduces ink costs. Still further, the colored polyurethane oligomer can be employed as a binder in combination with pigments to enhance color strength.

The gravure ink composition and its use in publication gravure printing has one or more of the following features:

- meets commercial viscosity requirements at relatively low solids content;
- reduced film thickness;
- greater color strength;
- improved rub resistance;
- reduced solids content; and
- a colored polyurethane oligomer which is soluble in conventional gravure ink solvents, particularly toluene, xylene, Rotosolve™ and mixtures thereof.

DETAILED DESCRIPTION OF THE INVENTION

Without limiting the scope of the invention, the preferred embodiments and features are hereinafter set forth. Unless otherwise indicated, all parts and percentages are by weight, average conditions are ambient i.e. one atmosphere of pressure and 25° C. and molecular weights are based on the arithmetic mean.

The terms aryl and arylene are intended to be limited to single and fused double ring aromatic hydrocarbons. Unless otherwise specified, aliphatic hydrocarbons are from 1 to 12 carbon atoms in length, and cycloaliphatic hydrocarbons comprise from 3 to 8 carbon atoms.

All the United States patents disclosed in the Specification are hereby incorporated by reference.

The gravure ink of the present invention can be characterized as having a volatile solvent, which evaporates upon application of the ink to a substrate, leaving behind the non-volatile component of the ink, referred to as the solids or solids component. The ink composition contains approximately 5 to 40 wt. % solids and about 60 to 95 wt. % volatile solvent. The solids may be dispersed in the ink or dissolved in the volatile solvent. The term non-volatile component is used herein to describe compounds which are left on the substrate, usually paper, when the ink dries during conventional publication gravure printing.

The volatile solvent in the ink composition is preferably an organic solvent. Any of a large number of organic solvents, alone or in combination, may be employed. By way of example, the organic solvent may be selected from aliphatic, naphthenic and aromatic hydrocarbons, alcohols, ketones, ethers and esters, drying and semi-drying oils, and halogenated organic solvents. Preferred organic solvents include:

(i) aromatic hydrocarbons having a single ring and a boiling point from 75° to 140° C.;

(ii) aliphatic and cycloaliphatic hydrocarbons having a boiling point from 60° to 340° C.;

(iii) esters of aliphatic acid having a boiling point from 65° to 175° C.;

(iv) ketones having a boiling point from 75° to 180° C.;

(v) alcohols having a boiling point from 60° to 260° C.;

(vi) ethers having a boiling point from 100° to 210° C.;

(vii) any of the organic solvents from groups (i) to (vi) above substituted with from 1 to 4 chloro or bromo substituents, and which have a boiling point of from 40° to 100° C.; and (viii) drying and semi-drying oils modified to have a viscosity of between 1000 and 7500 centipoise at 25° C.

Except for drying oils listed above, preferably the organic solvents are $C_3$ to $C_{40}$, compounds.

By way of example, not limitation, specific examples of organic solvents include toluene, xylene, $C_5$ to $C_{40}$ aliphatic and cycloaliphatic hydrocarbons, 1,1,1-trichloroethane, methylene chloride. Trade names for commercially available solvents include Textile Spints™, Lactol Spints™, Lacolene™, Rotosolve™, and VM&P Naphtha.

Also within the scope of the present invention are ink compositions which contain emulsions of water and organic solvent, such as disclosed in Batlaw et al, U.S. Pat. No. 5,389,130.

The solids component contains a polyurethane oligomer having copolymerized therewith a polyfunctional chromophore, referred hereto in as a "colored polyurethane oligomer". The colored polyurethane oligomer replaces all or a portion of the binder, or the binder and colorant in a conventional gravure ink composition.

The colored polyurethane oligomers of the present invention may be prepared by the addition reaction of a polyisocyanate and a colorant having at least two nucleophilic substituents selected from hydroxy, amino and thio groups. Optionally, the reaction mixture includes a polyol. Catalysts, such as tertiary amines and organometallic compounds, may also be present. The polyaddition reaction of a polyisocyanate and polynucleophile is well known in the art and is discussed in The ICI Polyurethanes Book John Wiley & Sons, (1987) and Kirk-Othmer Encyclopedia of Chemical Technology, 3rd ed., vol. 23, pp 576–608 (1983).

Crosslinking of the polyurethane oligomer is preferably minimized by selecting a diisocyanate, or polyisocyanate having a NCO number of from 2.0 to 2.5, preferably 2.0 to 2.1. Suitable diisocyanates include: 2,4-tolylene diisocyanate, 2,6-tolylene diisocyanate, mixtures of 2,4- and 2,6-tolylene diisocyanate, 4,4'-biphenylene diisocyanate, 2,2'-diphenylmethane diisocyanate, 4,4'-diphenylmethane diisocyanate, 2,4'-diphenylmethane diisocyante, tetramethyl-m-xylene diisocyanate, p-xylene diisocyanate, methylenedi-p-phenyl diisocyanate, m-phenylene diisocyanate, p-phenylene diisocanate, hexamethylene diisocyanate, isophorone diisocyanate, 4,4'-diisocyanatodiphenyl ether, bis(4-isocyanatophenyl) sulfone, isopropylidene bis(4-phenyl isocyanate), naphthalene-1,5-diisocyanate, 1-chloro-2,4-phenylene diisocyanate, 3,3'-bitolylene-4,4'-diisocyanate, 3,3'-dimethoxy-4,4'-biphenylene diisocyanate, 3,3'-dichloro-4, 4'-biphenylene diisocyanate, 2,2',5,5'-tetramethyl-4,4'-biphenylene diisocyanate, diphenylethane-4,4'-diisocyanate, dicyclohexylmethane-4,4'-diisocyanate, and the like.

The colorant is preferably difunctional and the nucleophilic functionalities are preferably hydroxy. Virtually any chromophore may be employed in the invention, including those from the following classes: azo, including polyazo, diphenylmethane, triarylmethane, xanthene, methine, including polymethine, acridene, quinoline, thiazole, indamine, indophenol, azine, oxazine, thiazine, anthraquinone, indigoid and phthalocyanine chromophores. Preferred chromophores are azos, diphenymethanes, triarylmethanes, xanthenes, methines, anthraquinones and phthalocyanines.

Example of suitable colorants include those having a nucleophilic group bonded to a chromophore by an alkylene group, as disclosed in Krutak et al., U.S. Pat. No. 5,194,463 or by a poly(oxyalkylene) group as disclosed in Cross et al., U.S. Pat. No. 4,284,729. Colorants which may be copolymerized in polyurethanes are also disclosed in Meek et al., U.S. Pat. No. 3,278,485 and Elmasry, U.S. Pat. No. 4,666, 819. All of the aforementioned references are incorporated by reference.

By way of example, for the diol component of the colored polyurethane oligomer, one may employ: ethylene glycol, 1,2-propanediol, 1,3-propanediol, 2-methyl-1,3-propanediol, 1,4-butanediol, 2,2-dimethyl-1,3-propanediol, 1,6-hexanediol, 1-10-decanediol, 1,12-dodecanediol, 1,2-cyclohexanediol, 1,3-cyclobutanediol, 2,2,4,4-tetramethylcyclobutane-1,3-diol, 1,4-cyclohexanediol, 1,2-cyclohexanedimethanol, 1,3-cyclohexanedimethanol, 1,4-cyclohexanedimethanol, x,8-bis(hydroxymethyl)-tricyclo-[5.2. 1.0]-decane, wherein x represents 3, 4, or 5; and diols containing one or more oxygen or sulfur atoms in the chain, e.g., diethylene glycol, 2,2'-thiodiethanol, triethylene glycol, dipropylene glycol, tripropylene glycol, 1,3- and 1,4-bis(2-hydroxyethyl)benzene, poly(oxyalkylene) diols and the like.

The greatest color strength will be achieved when the nucleophilic component of the polyurethane oligomer is primarily made up of functionalized colorant molecules. However, it may be desirable to modify the performance characteristics of the colored polyurethane oligomer by including a molar ratio of colorant to uncolored polyol, preferably a diol, in a range of 99:1 to 10:90, preferably 99:1 to 25:75, respectively. Most preferably, the colorant compounds comprise greater than 50 mole percent of nucleophilic components.

Colored polyurethane oligomers having the following characteristics are preferred:

soluble in toluene, xylene and/or Rotosolve™ at a concentration of at least 30 part per 100 parts of solvent;

an average molecular weight between 1,500 and 25,000;

viscosity at 25° C. of 70% solution in toluene is less than 2500 centipoise. Most preferably, the molecular weight ranges from 2,000 to 15,000.

In addition to the colored polyurethane oligomer, the non-volatile or solids component of the ink composition may also contain conventional colorants and binders. The most important class of colorants is pigments, and their use in gravure ink compositions is well known to those skilled in the art. By way of example and not limitation, the following pigments may be used and are identified by Colour Index reference in Table A below.

TABLE A

| Pigment Name | Color Index No. | Common Name |
| --- | --- | --- |
| Yellow 12 | 21090 | Diarylide AAA |
| Yellow 13 | 21100 | Diarylide AAMX |
| Yellow 14 | 21095 | Diarylide AAOT |
| Yellow 17 | 21105 | Diarylide AAOA |
| Red 3 | 12120 | Toluidine Red |
| Red 49:1 | 15630 | Barium Litho |
| Red 49:2 | 15630 | Calcium Lithol |
| Red 52:1 | 15680 | BON Calcium |
| Red 53:1 | 15585 | Lake Red C |
| Red 57:1 | 15850 | Rubine 4B |
| Blue 15 | 74160 | Phthalocyanine Blue |
| Blue 16 | 74100 | Phthalo Copper Free |
| Blue 18/56/61 | 42770/42800/42765:1 | Alkali Blue |
| Blue 24 | 42090:1 | Blue Lake |
| Blue 27 | 77510 | Iron Blue |
| Black 7 | 77266 | Carbon Black (Channel, Furnace and Lamp Black) |
| White 4 | 77947 | Zinc Oxide |
| White 6 | 77891 | Titanium Dioxide |
| White 18 | 77220 | Calcium Carbonate |
| White 24 | 77002 | Alumina Hydrate |
| White 27 | 77711 | Silica |

For purposes of the description herein, white pigments, clays, opacifiers and other pigment extenders are classified as pigments.

Also within the scope of the present invention are dyestuffs. Suitable dyestuffs include, but are not limited to, Acid Dyes, such as Acid Red 87, C.I. Number 45380, Basic Dyes, such as Basic Violet 10, C.I. Number 45170, and Basic Blue 26, C.I. Number 44045, Solvent Dyes such as Solvent Yellow 19, C.I. Number 13900: 1 and Solvent Black 7, C.I. Number 50415: 1, and Disperse Dyes, such as Disperse Yellow 3, C.I. Number 11855 and Disperse Red 4, C.I. Number 60755.

The dispersion of pigments and dyestuffs into vehicles using mixing and milling techniques, including in the case of some dyestuffs, dissolution of the colorant into the vehicle, is a well known manufacturing process.

Generally binders are resins described as solid materials, or liquids of a relatively high molecular weight, which adhere the colorant to a substrate when the ink dries. There are a wide variety of commercially available resins, and their selection and use is well known to practitioners in the field.

By way of example and not limitation, the following resins and mixtures thereof may be incorporated into the ink formulation:

rosin and modified rosins, such as calcium, magnesium and zinc metallic resinates, ester gum of rosin, maleic resins and esters, dimerized and polymerized rosins and rosin modified fumaric resins; shellac, asphalts, phenolic resins and rosin-modified phenolic resins; alkyd resins; polystyrene resins and copolymers thereof; terpene resins; alkylated urea formaldehyde resins; alkylated melamine formaldehyde resins; polyamide resins; vinyl resins, such as polyvinyl acetate and polyvinyl alcohol; ketone resins; acrylic resins, such as polyacrylic acid and polymethacrylic acid; epoxide resins; polyurethane resins; cellulosic resins, such as nitro cellulose, ethyl cellulose, cellulose acetate butyrate and carboxymethyl cellulose.

The formulation may also include a non-drying oil like Maggie Oil™, or a semi-drying oil or drying oil, such as linseed oil, tung oil and oiticica oil, as a binder. These oils undergo oxidative polymerization upon drying to form an adhesive film for the colorant. Typically, these oils are provided in a modified form to enhance their drying time and film forming properties. Modification generally includes heat polymerization to form cyclic, dimers, trimers and some higher order polymers. Viscosities of these modified oils generally range from 1000 to 7500 centipoise at 250° C. and they have a density of about 0.94 to 0.98 grams per ml.

It is also well known in the art to incorporate miscellaneous additives into the ink composition to enhance performance with regard to gloss, rub resistance, flexibility, uniform density of the print, flexibility and adhesion. These additives include plasticisers such as sucrose acetate isobutyrate, triethyl citrate, and epoxidized soy bean oil, and waxes such as polyethylene waxes, halogenated hydrocarbon waxes and fatty acid amides. In lesser amounts, additives such as surfactants, defoaming agents, catalysts, antioxidants, corrosion inhibitors, biocides and deodorants may be incorporated into the ink composition.

The solids component of the ink may contain from:

0.1 to 100 parts of a colored polyurethane oligomers;

0 to 20 parts pigment and dye;

0 to 75 parts binder; and up to 5 parts auxiliaries.

In a preferred embodiment, the colored polyurethane oligomer is at least 25%, most preferably at least 50% and, may even constitute 75% or more by way of the solids component of the ink. Thus, the solids component of the ink composition may contain from:

25 to 95 parts of a colored polyurethane oligomer;

0 to 20 parts pigment and dye;

0 to 50 parts binder; and up to 5 parts auxiliaries

An advantage of incorporating a colored polyurethane oligomer into a gravure ink is that the weight percent solids in the ink composition can be reduced, without sacrificing color strength or reducing the viscosity below working levels. Thus, inks having solid contents of 20 wt. % or less, or even 15 wt. % or less, may be employed and will have color strength comparable to standard inks at much higher solids content. Such inks form very thin films and are resistant to skip dots in light end print out, which may be caused by high viscosity or excessive solvent evaporation, referred to as "drying in". The reduced solids content ink generally results in printing having reduced film thickness. The lower solids content made possible with the addition of a colored polyurethane oligomer translates into a significant material cost savings, since a solvent is one the least expensive components of the ink.

The viscosity of the ink composition when used for gravure printing is generally between 10 seconds and 30 seconds by Shell Cup #2, preferably between 14 seconds and 20 seconds (the word "seconds" shall hereinafter be referred to as "s") measured at the press. The Shell Cup is a vessel of standard volume with an orifice at the bottom. The time it takes for the ink to empty out is measured in seconds; the longer the time, the higher the viscosity. These inks are typically used at temperatures ranging from 20° C. to 75° C. The viscosity requirements of gravure inks dramatically distinguish them from paste-like inks, such as lithographic inks.

The ink composition of the present invention is intended for use in conventional gravure printing. In general, the process entails an engraved gravure roll which is partially immersed in a pan filled with ink. As the gravure roll rotates, the cells on the surface of the roll pick up ink. A doctor blade scrapes off excess ink from the unengraved areas. A substrate, such as paper, is fed through a nip formed by an impression roller and the gravure roll, thereby transferring ink from the cell to the substrate. A description of the process may be found in the following references: R. H. Leach, The Printing Ink Manual, 5th Edition (ISBN 0-948905-81-6); and Gravure Process & Technology, Gravure Assoc. of America, Rochester, N.Y. (ISBN 1-880290-00-6).

The invention may be further understood by reference to the following examples, but the invention is not to be construed as being unduly limited thereby.

Print density was measured on the 100% tone scale with an X-Rite™ model 938 Spectrodensitometer using ANSI status T response. Print gloss was measured with a Gardner™ Micro-Gloss 60°.

EXAMPLE 1

The following examples demonstrate synthesis of a colored polyurethane oligomer from a poly(oxyalkylene) substituted yellow azo colorant, and formulation of gravure inks with the oligomer.

To the reactor was added 50.0 parts of a yellow azo colorant made from m-toluidine containing 5 moles of ethylene oxide and 5 moles of propylene oxide coupled to diazotized aniline. Preparation of the azo-yellow colorant is described in U.S. Pat. No. 4,284,729, Example I. To the colorant was added 10.2 parts of tetramethyl-m-xylene diisocyanate (Cytec TMXDI®) and 0.1 parts of dibutyltin dilaurate. The reaction mixture was heated with stirring at 85° C. until all of the isocyanate had reacted, about 2 hours.

The reaction mixture was cooled to 45° C. and 25 parts of toluene and 8.8 parts of a mixture of 4,4'-diphenylmethane diisocyanate, 2,2'-diphenylmethane diisocyanate, and 2,4'-diphenylmethane diisocyanate (Miles Mondur® ML) were added. The ratio of isocyanate groups to hydroxyl groups was 1.0. The mixture was heated at 85° C. until all of the isocyanate had reacted to give 94.0 parts of a yellow polyurethane oligomer solution in toluene with 73.4% solids.

GPC analysis of the product gave a median mw of 4400 and an average mw of 9332 using polyethylene glycol standards with a refractive index detector.

A yellow ink was made from the polyurethane oligomer by dissolving 1.0 part solids of the oligomer, 0.12 parts of a commercial resin made from modified wood rosin (Union Camp Unirez® 1144), and 8.9 parts toluene to give an ink with a #2 shell cup viscosity of 18 s and 10.7 wt. % solids.

EXAMPLES 2–5

Using the procedure of Example 1, the yellow colorant was reacted with different isocyanates to make soluble polyurethane oligomers. The compositions and molecular weights are shown in Table 1.

TABLE 1

| Example | Parts Colorant | Parts Isocyanate | NCO/OH Ratio | Median MW | Avg. MW |
|---|---|---|---|---|---|
| 2 | 217.0 | 63.1[a] | 0.825 | 2729 | 6858 |
| 3 | 100.0 | 41.0[b] | 0.80 | 3473 | 7723 |
| 4 | 100.0 | 37.6[c] | 1.09 | 7706 | 19,180 |
| 5 | 50.0 | 15.0[d] | 0.85 | 2281 | 3792 |

[a] = 4,4'-diphenylmethane diisocyanate, Dow 125-M ®.
[b] = commercially modified 4,4'-diphenylmethane diisocyanate, Dow 181 ®.
[c] = tetramethyl-m-xylene diisocyanate, Cytec TMXDI ®.
[d] = a mixture of 2,2'-, 2,4'- and 4,4'-diphenylmethane diisocyanates, Miles Modur ® ML.

Inks were made by combining the yellow polyurethane oligomers, a commercial resin (Union Camp Unirez 1144), and toluene in the proportions given in Table 2 below to give a #2 Shell cup viscosity of 18 s.

TABLE 2

| Example | Parts Oligomer | Parts Resin | Parts Toluene | wt. % Solids |
|---|---|---|---|---|
| 2 | 1.00 | 1.55 | 6.04 | 29.7 |
| 3 | 1.00 | 1.69 | 5.75 | 31.9 |
| 4 | 1.00 | 0.20 | 7.02 | 14.6 |
| 5 | 1.00 | 1.19 | 4.88 | 31.0 |

EXAMPLE 6

The following example demonstrates synthesis of a colored polyurethane oligomer from a poly(oxyalkylene) substituted yellow methine colorant, and formulation of a gravure ink.

First, m-toluidine was reacted with 2 moles of ethylene oxide and 8 moles of propylene oxide. Then, the m-toluidine derivative was converted to p-formyl m-toluidine as described in U.S. Pat. No. 4,658,064. The aldehyde was condensed with ethylcyanoacetate as described in U.S. Pat. No. 4,981,516 to make a yellow methine colorant. To the reactor was added 75.0 parts of the yellow colorant, 14.2 parts of tetramethyl-m-xylene diisocyanate (Cytec TMXDI®), and 0.1 parts of dibutyltin dilaurate. The reaction mixture was heated and stirred at 85° C. until the all of the isocyanate had reacted, about 2 hours. The reaction mixture was cooled to 45° C. and 50 parts of toluene and 12.4 parts of a mixture of 4,4'-diphenylmethane diisocyanate, 2,2' diphenylmethane diisocyanate, and 2,4'-diphenylmethane diisocyanate (Miles Mondur ML) were added. The ratio of isocyanate groups to hydroxyl groups was 1.04. The mixture was heated at 85° C. until all of the isocyanate had reacted to give 151.6 parts of yellow polyurethane oligomer solution in toluene at 67% solids.

GPC analysis of the product gave a median mw of 7147 and an average mw of 11,668 using polyethylene glycol standards with a refractive index detector.

A gravure ink was made by combining 1.0 parts of the methine polyurethane oligomer, 0.52 parts Union Camp Unirez 1144® resins and 7.2 parts toluene to give a Shell Cup #2 viscosity of 18 s and 17.6 wt. % solids.

EXAMPLE 7

The following example demonstrates synthesis of a colored polyurethane oligomer from a poly(oxyalkylene) substituted blue triphenyl methane colorant, and formulation of a gravure ink.

N-methyl aniline was reacted with 1 mole of ethylene oxide and 10 moles of propylene oxide. In the reactor 174.0 parts of the aniline derivative was condensed with 24.7 parts of o-formylbenzene sulfonic acid and then oxidized to a blue colorant as described in U.S. Pat. No. 4,871,371. To the reactor was added 21.3 parts of the blue colorant, 10 parts toluene, 2.5 parts of 4,4'-diphenylmethane diisocyanate (Dow 125M), and 0.1 parts of dibutyltin dilaurate. The ratio of isocyanate groups to hydroxyl groups was 0.8. The mixture was heated at 85° C. until all of the isocyanate had reacted to give 33.8 parts of blue polyurethane oligomer solution in toluene at 70% solids.

GPC analysis of the product gave a median mw of 2510 and an average mw of 3140 using polyethylene glycol standards with a refractive index detector.

A gravure ink was made by combining 1.0 parts of the triphenylmethane polyurethane oligomer, 0.69 parts Union Camp Unirez 144® resin and 6.3 parts toluene to give a Shell Cup #2 viscosity of 18 s and 21.1 wt. % solids.

EXAMPLE 8

The following example demonstrates synthesis of a colored polyurethane oligomer which incorporates a colorless diol, as well as a colorant, and formulation of a gravure ink. The colorant was a poly(oxyalkylene) substituted methine colorant made according to Example 6, except that instead of the m-toluidine intermediate, aniline which had been reacted with 15 moles of propylene oxide and 7 moles of ethylene oxide was employed.

To the reactor was added 22.0 parts of the yellow colorant 0.2 parts of butanediol, 3.66 parts of tetramethyl-m-xylene diisocyanate (Cytec TMXDI®), 10.0 parts toluene, and 0.1 parts of dibutyltin dilaurate. The ratio of isocyanate groups to hydroxyl groups was 0.90. The reaction mixture was heated with stirring at 85° C. until the all of the isocyanate had reacted, about 2 hours, to give 35.9 parts of yellow polyurethane polymer solution in toluene at 72% solids.

GPC analysis of the product gave a median mw of 2678 and an average mw of 4315 using polyethylene glycol standards with a refractive index detector.

A gravure ink was made by combining 1.0 parts of the colored polyurethane oligomer, 1.62 parts of Union Camp Unirez 1144® resin and 7.33 parts toluene, to give a Shell Cup #2 viscosity of 18 s and 26.4 wt. % solids.

EXAMPLE 9

The following example demonstrates application of the gravure inks of Examples 1–8, to 34 lb. coated paper using a laboratory K-proofer draw down plate. The results are shown in Table 3.

TABLE 3

| Ink | Print Density | Print Gloss |
|---|---|---|
| Example 1 | 1.58 | 42.1 |
| Example 2 | 1.14 | 25.7 |
| Example 3 | 1.16 | 29.6 |
| Example 4 | 1.17 | 26.6 |
| Example 5 | 1.19 | 25.4 |
| Example 6 | 0.67 | 29.2 |
| Example 7 | 1.81 | 31.6 |
| Example 8 | 0.52 | 39.2 |

The results demonstrate that at various print densities, the gravure inks of the present invention meet commercial requirements for viscosity and gloss. Additionally, the degree of cohesion or adhesion of the printed ink films (blocking) was measured by folding the print samples, ink side to ink side, and setting the folded print samples one at a time in a Sentinel Heat Sealer at 165° F. and 60 psi for 15 s. The print samples were unfolded and peeled freely one side from the other; the surfaces of the print samples were not marred.

EXAMPLE 10 (Comparative)

The following comparative examples demonstrate that gravure inks containing a colored polyurethane oligomer and combinations of the colored polyurethane oligomer and pigments, which are all within the scope of the present invention, meet the print quality standard of gravure inks containing only pigments as the coloring agent, the prior art inks.

YELLOW 12 PIGMENT DISPERSION

Sixty two and a half grams of Sun Chemical Sunbrite® Pigment Yellow 12, 150.0 g Resinall FP927 phenolic resin (50% solids), 0.25 g American Lecithin Alcolec S surfactant and 37.25 g toluene were added to an Eiger mill and dispersed at 5000 rpm for 10 minutes to give maximum particle size <1.0 micron by Hegmann gage. To 130.43 g of the pigment dispersion was added 19.27 g of toluene to give a #2 Shell cup viscosity of 18.0 s.

YELLOW 14 PIGMENT DISPERSION

Seventy five grams of Sun Chemical Spectra® Pigment Yellow 14, 180.0 g Resinall FP927 phenolic resin (50% solids), 0.30 g Alcolec S lecithin surfactant and 44.7 g toluene were added to an Eiger mill and dispersed at 5000 rpm for 10 minutes to give maximum particle size <1.0 micron by Hegmann gage. To 60.0 g of the pigment dispersion was added 11.0 g of toluene to give a #2 Shell cup viscosity of 18.0 s.

INK A

Pigment yellow 12 and yellow 14 dispersions, commercial resin (Union Camp Unirez 1144), and toluene were combined in the following proportions to give a running ink with a #2 Shell cup viscosity of 18 s.

| Ink Component | Amount |
|---|---|
| Yellow 12 pigment | 4.7 |
| Yellow 14 pigment | 0.6 |
| Resinall ® phenolic resin | 12.7 |
| Alcolec S ® surfactant | 0.02 |
| Toluene | 47.9 |
| Unirez 1144 resin | 34.1 |

INK B

The soluble polyurethane oligomers of Example 1 and 6, commercial resin (Union Camp Unirez 1144), and toluene were combined in the following proportions to give a running ink with a #2 Shell cup viscosity of 18 s.

| Ink Component | Amount | |
|---|---|---|
| Polyurethane oligomer of Ex. 1 | 2.6 | (Based on solids) |
| Polyurethane oligomer of Ex. 7 | 12.8 | (Based on solids) |
| Toluene | 81.8 | |
| Unirez 1144 resin | 2.8 | |

Comparing the pigment Ink A with the soluble polyurethane oligomer Ink B, one finds that Ink B used 94% less resin and 71% more toluene. With pigments, it is necessary to use resins during dispersion to keep the particles separated. Pigments do not have inherent cohesive properties and require additional resinous material in order to make an ink film. The polyurethane oligomers are soluble and do not require dispersants. The polyurethane oligomers have both color and resin properties.

Inks A and B were applied to 34 lb. coated paper using a laboratory K-proofer draw down plate. Additionally, the inks were combined at the following weight percentages—25% Ink A and 75% Ink B; 50% Ink A and 50% Ink B; and 75% Ink A and 25% Ink B, and printed. The print samples were overcoated with clear resin (Unirez 1144).

The printed paper samples were analyzed using CIELab coordinates measured using an X-Rite model 938 Spectrodensitometer. The spectrodensitometer was adjusted to D65 illuminant and 10° viewer. The L, a* and b* color coordinates for the different paper samples are given in Table 4 below where L is a measure of lightness or darkness, a* is a measure of redness or greenness, and b* is a measure of yellowness or blueness of the print. The color difference (ΔE) of each test print was calculated according to the following equation:

$$\Delta E = (\Delta L)^2 + (\Delta a^*)^2 + (\Delta b^*)^2$$

where (ΔE) represents the difference in color between the print sample made with 100% pigment ink (Ink A) and print samples made with soluble polyurethane oligomer (Ink B) and mixtures of Inks A and Ink B.

TABLE 4

| Ink Sample | L | a | b | ΔE | Density T |
|---|---|---|---|---|---|
| 100% - Ink A | 81.69 | 0.57 | 94.62 | — | 0.945 |
| 75% Ink A/25% Ink B | 81.01 | 1.02 | 97.66 | 3.15 | 0.970 |
| 50% Ink A/50% Ink B | 81.52 | 1.52 | 97.00 | 2.56 | 0.980 |
| 25% Ink A/75% Ink B | 81.31 | 2.08 | 97.50 | 3.27 | 0.980 |
| 100% - Ink B | 80.52 | 2.33 | 94.94 | 2.14 | 0.940 |

The print results show that Ink B closely matches the color and print density of 100% pigmented Ink A. The results show that equivalent print results are obtained when Ink B is blended with 100% pigmented Ink A at a wide range of percentages.

The print samples from Table 4 were tested for rub resistance. The print samples were folded ink side to ink side and were rubbed vigorously by hand for 5 s. The samples were rated from 1 to 5 where a rating of 1 corresponded to essentially complete removal of the ink film and a rating of 5 corresponded to no damage to the ink film. The ratings for the print samples are given in Table 5.

TABLE 5

| Ink Sample | Rub Rating |
|---|---|
| 100% - Ink A | 1 |
| 75% Ink A/25% Ink B | 2 |
| 50% Ink A/50% Ink B | 2 |
| 25% Ink A/75% Ink B | 4 |
| 100% - Ink B | 5 |

The results showed severe damage to the 100% pigment ink film. Replacement of some of the pigment and resin with colored polyurethane oligomer improved rub resistance. Rub resistance improved as the concentration of colored polyurethane oligomer increased. When all of the pigment was replaced, the ink film was undamaged by rub testing.

EXAMPLE 11

The following example demonstrates that the color strength of a gravure ink colored with pigments can be increased by employing the colored polyurethane oligomer as a dispersant/binder in the ink composition.

Sixty six and a half grams of Sun Chemical Sunbrite® Pigment Yellow 12, 8.5 grams of Sun Chemical Spectra® Pigment Yellow 14, 0.3 g American Lecithin Alcolec® S surfactant, 35.0 grams Resinall® FP927 phenolic resin (50% solids), 35.0 grams Resinall FP127 (50% solids, modified wood rosin), 18.4 grams colored polyurethane oligomer of Example 1 (50.0% solids), 90.6 grams colored polyurethane oligomer of Example 6 (64.6% solids), and 135.3 grams of toluene were added to an Eiger mill and dispersed at 5000 rpm for 10 minutes to give maximum particle size <1.0 micron by Hegmann gage. To 47.4 g of the colored polyurethane oligomer and pigment dispersion was added 42.7 g of toluene and 9.9 g of a commercial resin (Union Camp Unirez 1144) to give a #2 Shell cup viscosity of 18.0 s and the following composition.

| Ink Component | Amount |
|---|---|
| Yellow 12 pigment | 4.7 |
| Yellow 14 pigment | 0.6 |
| Resinall FP927 phenolic resin | 2.5 |
| Resinall FP127 resin | 2.5 |
| Polyurethane oligomer of Example 1 | 0.7 |
| Polyurethane oligomer of Example 6 | 3.9 |
| Toluene | 75.2 |
| Unirez 1144 resin | 9.9 |

The amount of Yellow 12 and 14 pigment in the ink of the present example is the same as in Ink A of Example 10. The ink of the present example was applied to 34 lb. coated paper using a laboratory K-proofer draw down plate. The print sample was overcoated with clear resin (Unirez 1 144). The print results are summarized in Table 6.

TABLE 6

| Ink | L | a | b | Density T |
|---|---|---|---|---|
| Example 11 | 78.60 | 10.69 | 110.20 | 1.341 |

The print results show that the ink (pigment plus colored polyurethane oligomer) gave significantly darker print compared to Ink A (100% pigment). These soluble polyurethane colorant polymers can replace some of the clear resin used to disperse pigments resulting in greater print density.

There are, of course, many alternate embodiments and modifications of the invention, which are intended to be included within the scope of the following claims.

What we claim is:

1. An ink composition comprising a liquid vehicle and a colored polyurethane oligomer dissolved in the vehicle, wherein the colored polyurethane oligomer is an addition product of a poly(oxyalkylene) substituted chromophore and a polyisocyanate.

2. The ink composition of claim 1 wherein the colored polyurethane oligomer has an average molecular weight of between 1,500 and 25,000.

3. The ink composition of claim 1 having a viscosity at 25° C. of from 10 to 30 seconds by Shell Cup #2.

4. The ink composition of claim 1 comprising from 5 to 40 weight % solids and from 60 to 95 weight % of a volatile solvent.

5. The ink composition of claim 3 wherein the volatile solvent is selected from aliphatic, naphthenic and aromatic hydrocarbons containing from 3 to 40 carbon atoms.

6. The ink composition of claim 1 further comprising a pigment dispersed in the composition.

7. An ink composition comprising a liquid vehicle and a colored polyurethane oligomer dissolved in the vehicle, wherein the liquid vehicle comprises a volatile organic solvent selected from the group consisting of aliphatic, naphthenic and aromatic hydrocarbons, alcohols, ethers and esters, all having from 3 to 40 carbon atoms and the composition comprises from 5 to 40 weight % solids and from 60 to 95 weight % of the volatile organic solvent.

8. The ink composition of claim 7 wherein the colored polyurethane oligomer has an average molecular weight of between 1,500 and 25,000.

9. The ink composition of claim 7 having a viscosity at 25° C. of from 10 to 30 seconds by Shell Cup #2.

10. The ink composition of claim 7 wherein the volatile organic solvent is selected from aliphatic, naphthenic and aromatic hydrocarbons containing from 3 to 40 carbon atoms.

11. The ink composition of claim 7 wherein the colored polyurethane oligomer has an average molecular weight of between 2,000 and 15,000, and the ink composition has a viscosity at 25° C. of from 14 to 20 seconds by Shell Cup #2.

12. An ink composition comprising at least three separate components, including (a) a volatile solvent, (b) a non-volatile, film-forming binder selected from the group consisting of resins and oils capable of undergoing oxidative polymerization upon drying and (c) a colored polyurethane oligomer dissolved in the volatile solvent wherein the oligomer is an addition product of a poly(oxyalkylene) substituted chromophore and a polyisocyanate.

13. The ink composition of claim 12 wherein the film-forming binder is selected from the group consisting of rosin and modified rosins, ester gum of rosin, maleic resins and esters, dimerized and polymerized rosins and rosin modified fumaric resins; shellac, asphalts, phenolic resins and rosin-modified phenolic resins; alkyd resins; polystyrene resins and copolymers thereof; terpene resins; alkylated urea formaldehyde resins; alkylated melamine formaldehyde resins; polyamide resins; vinyl resins, ketone resins; acrylic resins, epoxide resins; polyurethane resins; and cellulosic resins, and oils capable of undergoing oxidative polymerization upon drying.

14. The ink composition of claim 12 comprising from 5 to 40 weight % solids and from 60 to 95 weight % of the volatile solvent.

15. The ink composition of claim 14 wherein the volatile solvent is selected from aliphatic, naphthenic and aromatic hydrocarbons containing from 3 to 40 carbon atoms.

16. The ink composition of claim 12 wherein the colored polyurethane oligomer has an average molecular weight of between 1,500 and 25,000, and the ink composition has a viscosity at 25° C. of from 10 to 30 seconds by Shell Cup #2.

17. An ink composition comprising a liquid vehicle and a colored polyurethane oligomer dissolved in the vehicle, wherein the colored polyurethane oligomer is an addition product of a chromophore selected from the group consisting of diphenylmethane, triarylmethane, xanthene, methine, acridene, quinoline, thiazole, indamine, indophenol, azine, oxazine, thiazine, anthraquinone, indigoid and phthalocyanine chromophores, and a polyisocyanate and the composition comprises from 5 to 40 weight % solids and from 60 to 95 weight % of a volatile solvent.

18. The ink composition of claim 17 wherein the vehicle comprises a volatile organic solvent selected from aliphatic, naphthenic and aromatic hydrocarbons containing from 3 to 40 carbon atoms.

19. The ink composition of claim 17 wherein the colored polyurethane oligomer is an addition product of a poly(oxyalkylene) substituted chromophore and a polyisocyanate.

20. The ink composition of claim 17 further comprising a pigment dispersed in the composition.

* * * * *